(12) United States Patent
Fujiwara et al.

(10) Patent No.: US 6,708,479 B1
(45) Date of Patent: *Mar. 23, 2004

(54) BRAIDING YARN MADE OF EXPANDED GRAPHITE

(75) Inventors: Masaru Fujiwara, Sanda (JP); Takashi Ikeda, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/926,023

(22) PCT Filed: Dec. 25, 2000

(86) PCT No.: PCT/JP00/09174

§ 371 (c)(1),
(2), (4) Date: Aug. 15, 2001

(87) PCT Pub. No.: WO01/48400

PCT Pub. Date: Jul. 5, 2001

(30) Foreign Application Priority Data

Dec. 27, 1999 (JP) .............................. 11-369908

(51) Int. Cl.⁷ .............................. D02G 3/02; D02G 3/44
(52) U.S. Cl. ........................................... 57/200; 57/210
(58) Field of Search .................................. 57/200, 210

(56) References Cited

U.S. PATENT DOCUMENTS

| | | | | |
|---|---|---|---|---|
| 5,339,520 A | * | 8/1994 | Leduc | 29/888.3 |
| 5,370,405 A | * | 12/1994 | Ueda | 277/537 |
| 5,549,306 A | * | 8/1996 | Ueda | 277/537 |
| 5,605,341 A | * | 2/1997 | Ueda | 277/536 |
| 5,683,778 A | * | 11/1997 | Crosier | 428/59 |
| 5,765,838 A | * | 6/1998 | Ueda et al. | 277/650 |
| 6,027,809 A | * | 2/2000 | Ueda et al. | 428/408 |
| 6,270,083 B1 | * | 8/2001 | Hirschvogel et al. | 277/536 |
| 6,299,976 B1 | * | 10/2001 | Tsukamoto | 428/364 |
| 6,385,956 B1 | * | 5/2002 | Ottinger et al. | 57/200 |
| 6,502,382 B1 | * | 1/2003 | Fujiwara et al. | 57/200 |
| 2002/0069635 A1 | * | 6/2002 | Tsukamoto | 57/200 |

FOREIGN PATENT DOCUMENTS

JP 6-279752 10/1994

* cited by examiner

Primary Examiner—John J. Calvert
Assistant Examiner—Shaun R Hurley
(74) Attorney, Agent, or Firm—Jones, Tullar & Cooper, P.C.

(57) ABSTRACT

The present invention relates to a braiding yarn made of expanded graphite for a gland packing which is to be used in a shaft seal part of a fluid apparatus or the like. In the braiding yarn made of expanded graphite of the invention, a braiding yarn base material of the inner-reinforce type is used in which a plurality of reinforcing fibers are embedded in the longitudinal direction in an expanded graphite tape of a predetermined width, with forming gaps in the width direction. A twisting process is performed in a state where both the end portions in the width direction of the expanded graphite tape are bent so that both the end portions in the width direction of the expanded graphite tape are directed toward the inner side in the width direction of the base material. Alternatively, while twisting the base material both the end portions in the width direction of the expanded graphite tape are bent so that both end portions in the width direction are directed toward the inner side in the width direction. According to the invention, flaking of expanded graphite particles during a process of twisting the braiding yarn made of expanded graphite is reduced or prevented from occurring.

13 Claims, 11 Drawing Sheets

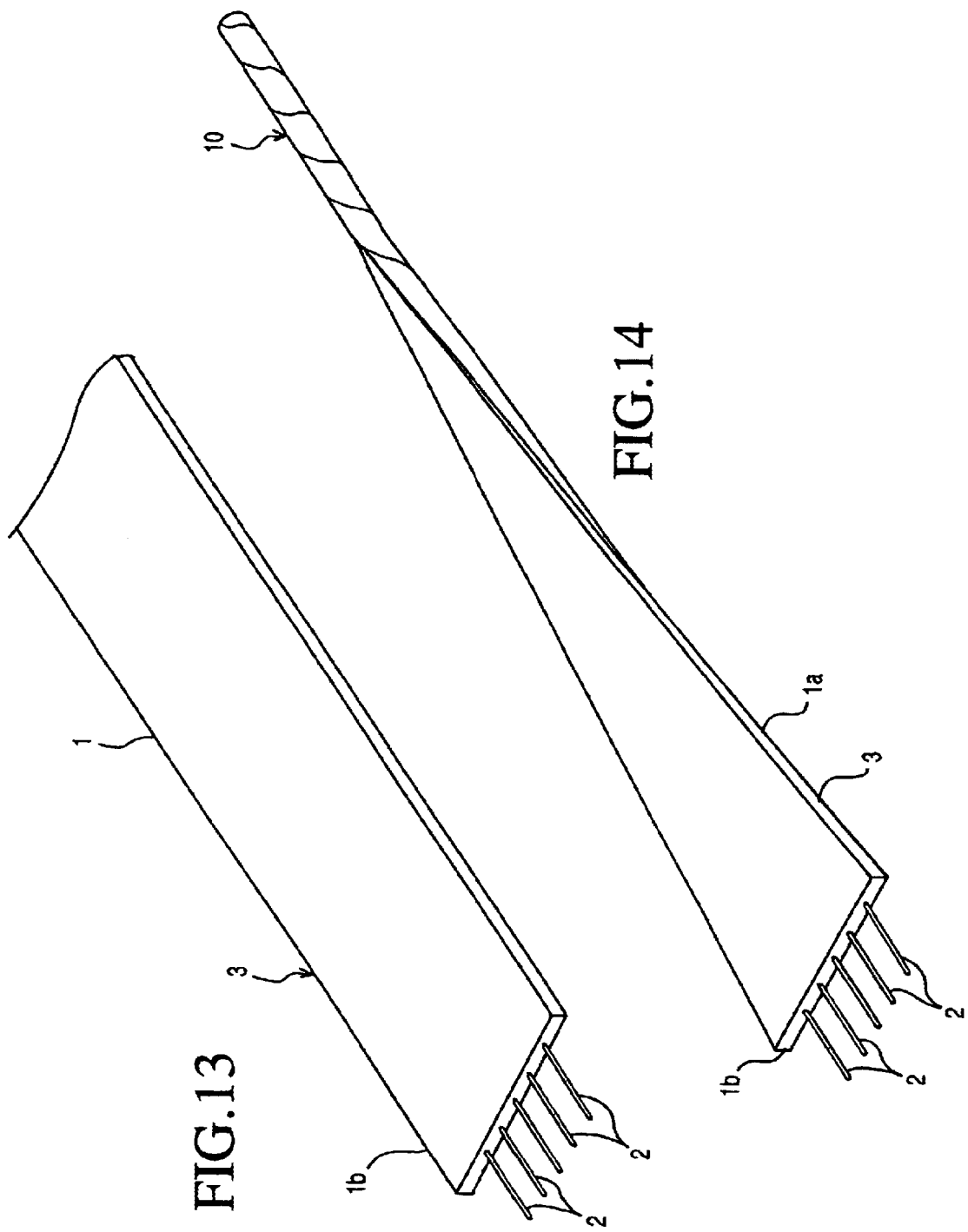

BRAIDING YARN MADE OF EXPANDED GRAPHITE

TECHNICAL FIELD

The present invention relates to a braiding yarn made of expanded graphite for a gland packing which is to be used in a shaft seal part of a fluid apparatus or the like, and more particularly to a braiding yarn made of expanded graphite which can enhance the pressure resistance of a gland packing.

BACKGROUND ART

Conventionally, as a braiding yarn for a gland packing which is to be used in a shaft seal part of a fluid apparatus or the like, known is, for example, a braiding yarn 3 shown in FIG. 13. In the braiding yarn 3, a plurality of reinforcing fibers 2, 2 are embedded in the longitudinal direction with forming gaps in the width direction of an expanded graphite tape 1 of a predetermined width.

In the case where a plurality of braiding yarns are braided to obtain a gland packing, it may be requested to twist the braiding yarn 3 as shown in FIG. 14 in order to satisfactorily conduct the braiding.

However, the expanded graphite tape 1 is low in tensile strength and brittle, and edges of both end portions 1a, 1b in the width direction have low flaking resistance among expanded graphite particles. In edges of both end portions 1a, 1b in the width direction, namely, expanded graphite particles easily flake off In the case where the braiding yarn 3 of the inner-reinforce type is twisted to obtain a twisted braiding yarn 10 made of expanded graphite, moreover, large tensile and shearing forces act on the edges of both end portions 1a, 1b in the width direction, and hence cracks are formed with starting from the edges of both the end portions 1a, 1b in the width direction. Therefore, expanded graphite particles in and in the vicinity of the edges of both the end portions 1a, 1b in the width direction flake off.

When a plurality of braiding yarns 10 made of expanded graphite having a twisted structure are braided or twisted in a state where expanded graphite particles flake off in this way, flaking of expanded graphite particles is further advanced during the braiding or twisting process.

SUMMARY OF THE INVENTION

It is an object of the invention to provide a braiding yarn made of expanded graphite in which flaking of expanded graphite particles is reduced or prevented from occurring.

In order to attain the object, the braiding yarn made of expanded graphite according to the invention is characterized in that, in a braiding yarn made of expanded graphite which is to be used in a gland packing, the braiding yarn is twisted so that at least one end portion in a width direction of a braiding yarn base material in which reinforcing fibers are embedded in an expanded graphite tape is directed toward an inner side in the width direction of the braiding yarn base material. According to the invention, since a twisting process is performed so that at least one end portion in the width direction of a braiding yarn base material is directed toward the inner side in the width direction of the braiding yarn base material, large tensile and shearing forces do not directly act on the edges of the one end portion during a twisting process, and hence occurrence of cracks from the edges of the one end portion and flaking of expanded graphite particles due to the occurrence of cracks can be reduced.

The other braiding yarn made of expanded graphite according to the invention is characterized in that, in a braiding yarn made of expanded graphite which is to be used in a gland packing, the braiding yarn is twisted so that at least one end portion in a width direction of a braiding yarn base material in which reinforcing fibers are embedded in an expanded graphite tape is directed toward an inner side in the width direction of the braiding yarn base material and a portion between both end portions in the width direction is bent. According to the invention, in addition to the function that, during a twisting process, large tensile and shearing forces do not directly act on the edges of the one end portion and occurrence of cracks from the edges of the one end portion and flaking of expanded graphite particles due to the occurrence of cracks can be reduced, since the portion between both the end portions in the width direction of the braiding yarn base material is bent, the dimension in the width direction of the braiding yarn base material can be reduced, the twisting process is facilitated, and twisting workability can be improved.

The further braiding yarn made of expanded graphite according to the invention is characterized in that, in a braiding yarn made of expanded graphite which is to be used in a gland packing, a braiding yarn base material in which reinforcing fibers are embedded in an expanded graphite tape and part of expanded graphite particles on a side of a surface of the expanded graphite tape are removed by a blasting process and is twisted. According to the invention, part of expanded graphite particles which are on the side of the surface of the expanded graphite tape, and which are highly oriented at a high density where cracks easily occur are removed by the blasting process. During the twisting process, even when a large tensile force acts on the end portions in the width direction of the braiding yarn base material, therefore, occurrence of cracks from the end portions and flaking of expanded graphite particles due to the occurrence of cracks can be reduced.

The still further braiding yarn made of expanded graphite according to the invention is characterized in that, in a braiding yarn made of expanded graphite which is to be used in a gland packing, the braiding yarn is twisted so that at least one end portion in a width direction of a braiding yarn base material in which reinforcing fibers are embedded in an expanded graphite tape and part of expanded graphite particles on a side of a surface of the expanded graphite tape are removed by a blasting process and is directed toward an inner side in the width direction of the braiding yarn base material. According to the invention, in addition to the function that, during the twisting process, large tensile and shearing forces do not directly act on the edges of the one end portion and occurrence of cracks from the edges of the one end portion and flaking of expanded graphite particles due to the occurrence of cracks can be reduced, since part of the expanded graphite particles which are on the side of the surface of the expanded graphite tape, and which are highly oriented at a high density where cracks easily occur are removed by the blasting process, a function that, during the twisting process, even when a large tensile force acts on both end portions in the width direction of the braiding yarn base material, therefore, occurrence of cracks from the end portions and flaking of expanded graphite particles due to the occurrence of cracks can be reduced is added. Consequently, occurrence of cracks and flaking of expanded graphite particles due to the occurrence of cracks can be reduced more surely.

The still further braiding yarn made of expanded graphite according to the invention is characterized in that, in a braiding yarn made of expanded graphite which is to be used in a gland packing, the braiding yarn is twisted so that at least one end portion in a width direction of a braiding yarn base material in which reinforcing fibers are embedded in an expanded graphite tape and part of expanded graphite particles on a side of a surface of the expanded graphite tape are removed by a blasting process is directed toward an inner side in the width direction of the braiding yarn base material and a portion between both end portions in the width direction is bent. According to the invention, in addition to the function that, during the twisting process, large tensile and shearing forces do not directly act on the edges of the one end portion and occurrence of cracks from the edges of the one end portion and flaking of expanded graphite particles due to the occurrence of cracks can be reduced, since the portion between both end portions in the width direction is bent, the dimension in the width direction of the braiding yarn base material can be reduced, the twisting process is facilitated, and twisting workability can be improved.

The still further braiding yarn made of expanded graphite according to the invention is characterized in that, in a braiding yarn made of expanded graphite which is to be used in a gland packing, a braiding yarn base material in which reinforcing fibers are embedded in an expanded graphite tape and part of expanded graphite particles on a side of a surface of the expanded graphite tape are removed by a blasting process is twisted. According to the invention, since part of the expanded graphite particles which are on the side of the surface of the expanded graphite tape, and which are highly oriented at a high density where cracks easily occur are removed by the blasting process. During the twisting process, even when a large tensile force acts on the end portions in the width direction of the braiding yarn base material, therefore, occurrence of cracks from the end portions and flaking of expanded graphite particles due to the occurrence of cracks can be reduced. Consequently, occurrence of cracks and flaking of expanded graphite particles due to the occurrence of cracks can be prevented more surely.

The still further braiding yarn made of expanded graphite according to the invention is characterized in that, in the braiding yarn base material, the surface side of the expanded graphite tape on which the removal by the blasting process is performed is impregnated with a lubricating material. According to the invention, part of expanded graphite particles which are on the side of the surface of the expanded graphite tape, and which are highly oriented at a high density are removed by the blasting process, whereby gaps of high permeability are formed among the expanded graphite particles. Therefore, a lubricating material easily permeates through the gaps. When the gaps are impregnated with a lubricating material, it is possible to improve the lubricity, the adaptability, and the like of the braiding yarn made of expanded graphite.

The still further braiding yarn made of expanded graphite according to the invention is characterized in that the reinforcing fibers are embedded in the expanded graphite tape via an adhesive agent. According to the invention, high tensile strength of the reinforcing fibers is surely given to the braiding yarn made of expanded graphite by the adhesive strength of the adhesive agent, so that the tensile strength of the braiding yarn made of expanded graphite can be enhanced.

In each of the above-mentioned variants of the invention, "so that at least one end portion in a width direction of a braiding yarn base material is directed toward an inner side in the width direction of the braiding yarn base material" means that, during the twisting process, one end portion only is directed toward the inner side in the width direction of the braiding yarn base material. For example, therefore, the one end portion may be previously bent toward the inner side in the width direction of the braiding yarn base material before the twisting process, and, during the twisting process, the one end portion may be caused to be directed toward the inner side in the width direction of the braiding yarn base material. Alternatively, the one end portion may be previously formed into a curled shape, a spiral shape, an obliquely inward-directed shape, or another shape, and, during the twisting process, the one end portion may be caused to be directed toward the inner side in the width direction of the braiding yarn base material.

The number of the braiding yarn base material is not restricted to one. A plurality of braiding yarn base materials may be stacked together, and the braiding yarn base materials may be twisted so that at least one end portion in a width direction of each of the braiding yarn base materials is directed toward an inner side in the width direction of the braiding yarn base material.

It is a matter of course that both end portions in a width direction of a braiding yarn base material may be directed toward an inner side in the width direction of the braiding yarn base material.

Furthermore, the terms that a portion between both end portions in the width direction of the braiding yarn base material is bent mean that, during the twisting process, a portion between both end portions in the width direction is requested only to be bent.

BRIEF DESCRIPTION OF DRAWINGS

FIG. 13 is a perspective view showing an example of a braiding yarn base material of the inner-reinforce type.

FIG. 14 is a perspective view showing an example of a conventional braiding yarn made of expanded graphite.

DESCRIPTION OF THE PREFERRED EMBODIMENTS

Figure 1:
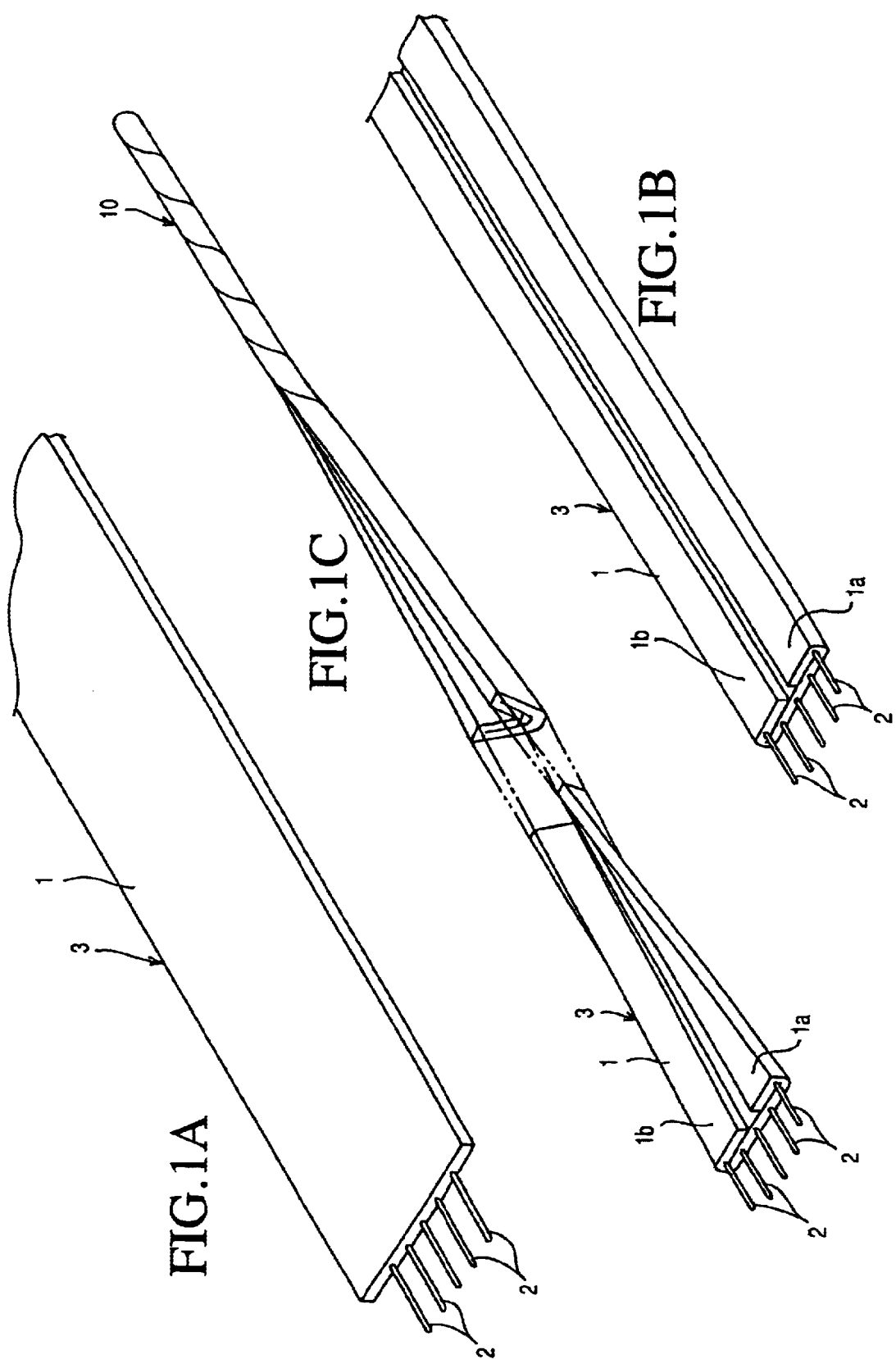
FIG. 1A is a perspective view of a braiding yarn base material in an embodiment of the invention.
FIG. 1B is a perspective view of a braiding yarn base material in an embodiment of the invention.
FIG. 1C is a perspective view showing an embodiment of the invention.

Hereinafter, preferred embodiments of the invention will be described with reference to the drawings. FIGS. 1A to 1C are perspective views showing embodiments of the braiding yarn made of expanded graphite of the invention. Referring to these figures, in the braiding yarn 10 made of expanded graphite, a braiding yarn base material 3 of the inner-reinforce type is used in which, as shown in FIG. 1A, a plurality of reinforcing fibers 2, 2 are embedded in the longitudinal direction in an expanded graphite tape 1 of a predetermined width, with forming gaps in the width direction. Both the end portions in the width direction of the braiding yarn base material 3, i.e., both the end portions 1a, 1b in the width direction of the expanded graphite tape 1 are bent so as to be directed toward the inner side in the width direction of the braiding yarn base material 3 as shown in FIG. 1B. Thereafter, as shown in FIG. 1C, the braiding yarn base material is twisted by bending a center portion in the width direction of the braiding yarn base material 3, into a V-like shape in the longitudinal direction, or the braiding yarn base material 3 of the 0-reinforce type of FIG. 1B is twisted.

As the reinforcing fibers 2, used is one selected from organic fibers such as cotton, rayon, phenol, aramid, PBO, PBI, PTFE, PPS, and PEEK; one selected from inorganic fibers such as glass fiber, carbon fiber, and ceramic fiber; or one selected from metal wires such as stainless steel, inconel, and monel. Of course, the organic fibers, the inorganic fibers, and the metal wires may be adequately selected to be combinedly used.

Figure 2:
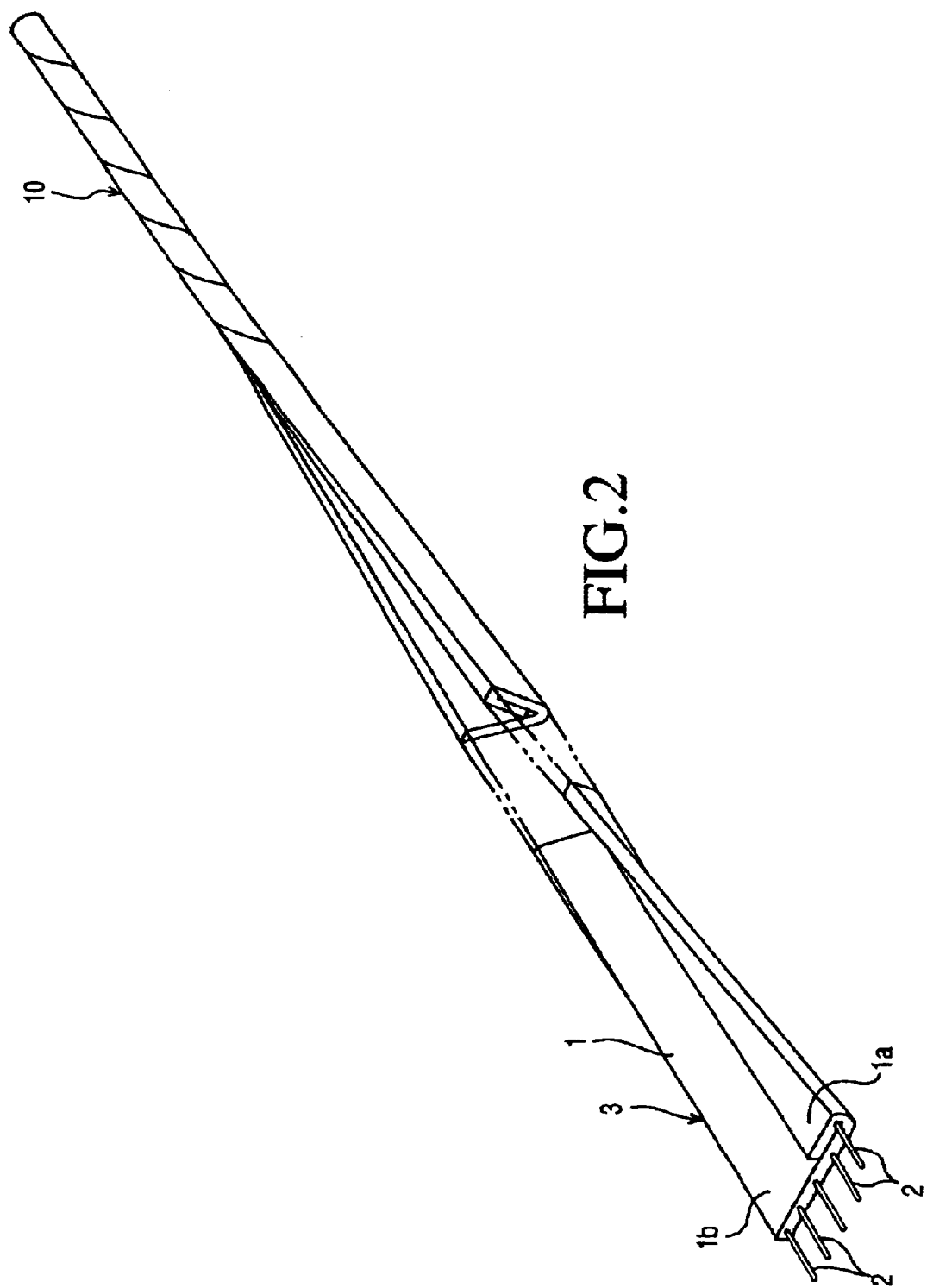
FIG. 2 is a perspective view showing another embodiment of the invention.

FIG. 2 is a perspective view showing another embodiment of the braiding yarn made of expanded graphite of the invention. In the figure, in the braiding yarn 10 made of expanded graphite, a braiding yarn base material 3 of the inner-reinforce type is used in which a plurality of reinforcing fibers 2, 2 are embedded in the longitudinal direction in an expanded graphite tape 1 of a predetermined width, with forming gaps in the width direction. Only one end portion 1a in the width direction of the braiding yarn base material 3 is bent so as to be directed toward the inner side in the width direction of the braiding yarn base material 3. Thereafter, the braiding yarn base material is twisted by bending a center portion in the width direction of the braiding yarn base material 3, into a V-like shape in the longitudinal direction, or the braiding yarn base material 3 is twisted without performing bending into a V-like shape.

Figure 3:
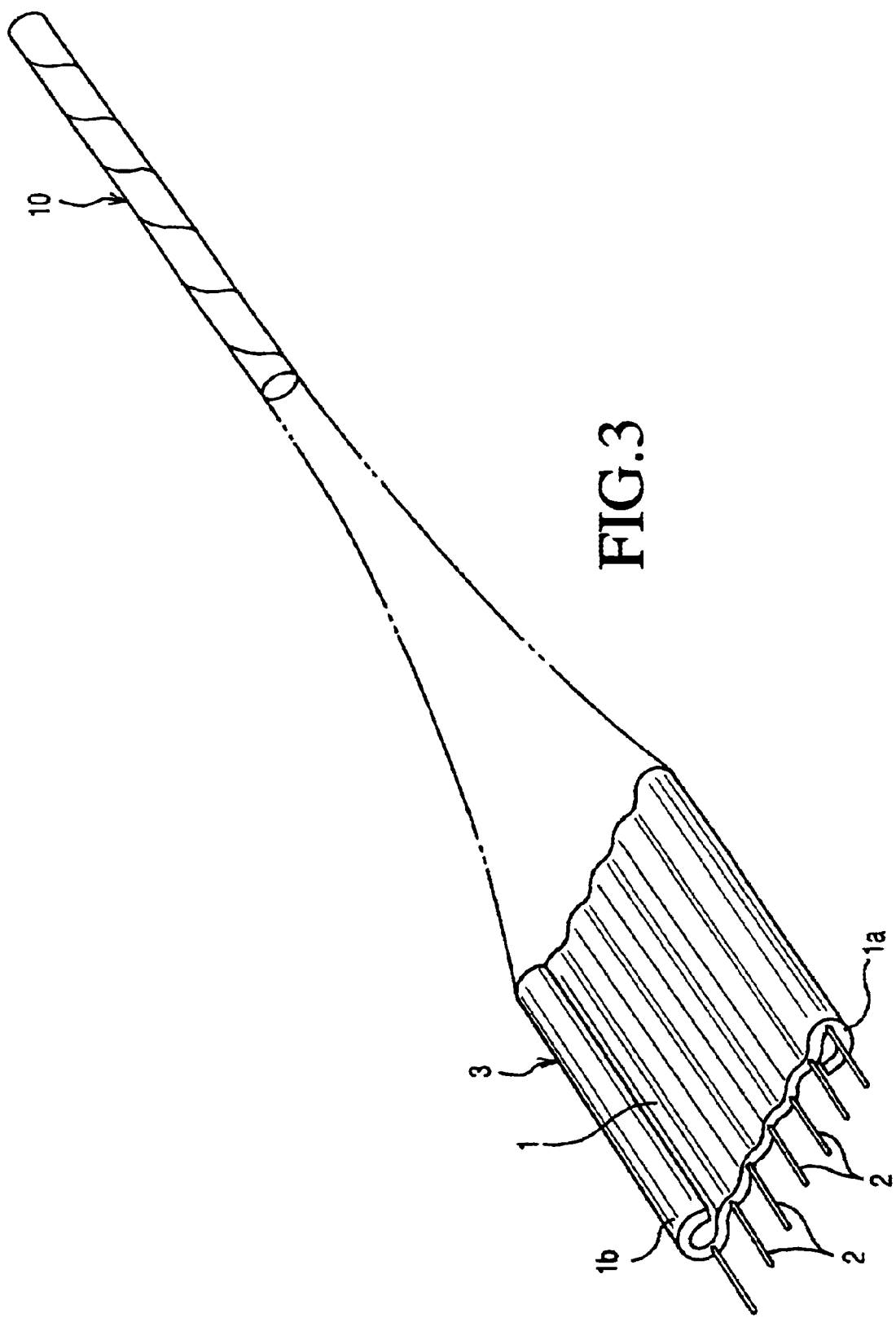
FIG. 3 is a perspective view showing a further embodiment of the invention.

FIG. 3 is a perspective view showing a further embodiment of the braiding yarn made of expanded graphite of the invention. In the figure, in the braiding yarn 10 made of expanded graphite, a braiding yarn base material 3 of the inner-reinforce type is used in which a plurality of reinforcing fibers 2, 2 are embedded in the longitudinal direction in an expanded graphite tape 1 of a predetermined width, with forming gaps in the width direction. Both the end portions 1a, 1b in the width direction of the expanded graphite tape 1 are curled so that both the end portions in the width direction of the braiding yarn base material 3, i.e., both the end portions 1a, 1b in the width direction of the expanded graphite tape 1 are directed toward the inner side in the width direction of the braiding yarn base material 3, and a plurality of places between the end portions 1a, 1b are bent in the longitudinal direction. Thereafter, the braiding yarn base material is twisted. Alternatively, the end portions 1a, 1b are curled while twisting the braiding yarn base material 3 of the inner-reinforce type, and a plurality of places between the end portions 1a, 1b are bent in the longitudinal direction. The end portions 1a, 1b in the width direction of the expanded graphite tape 1 are directed toward the inner side in the width direction of the braiding yarn base material 3.

Figure 4:
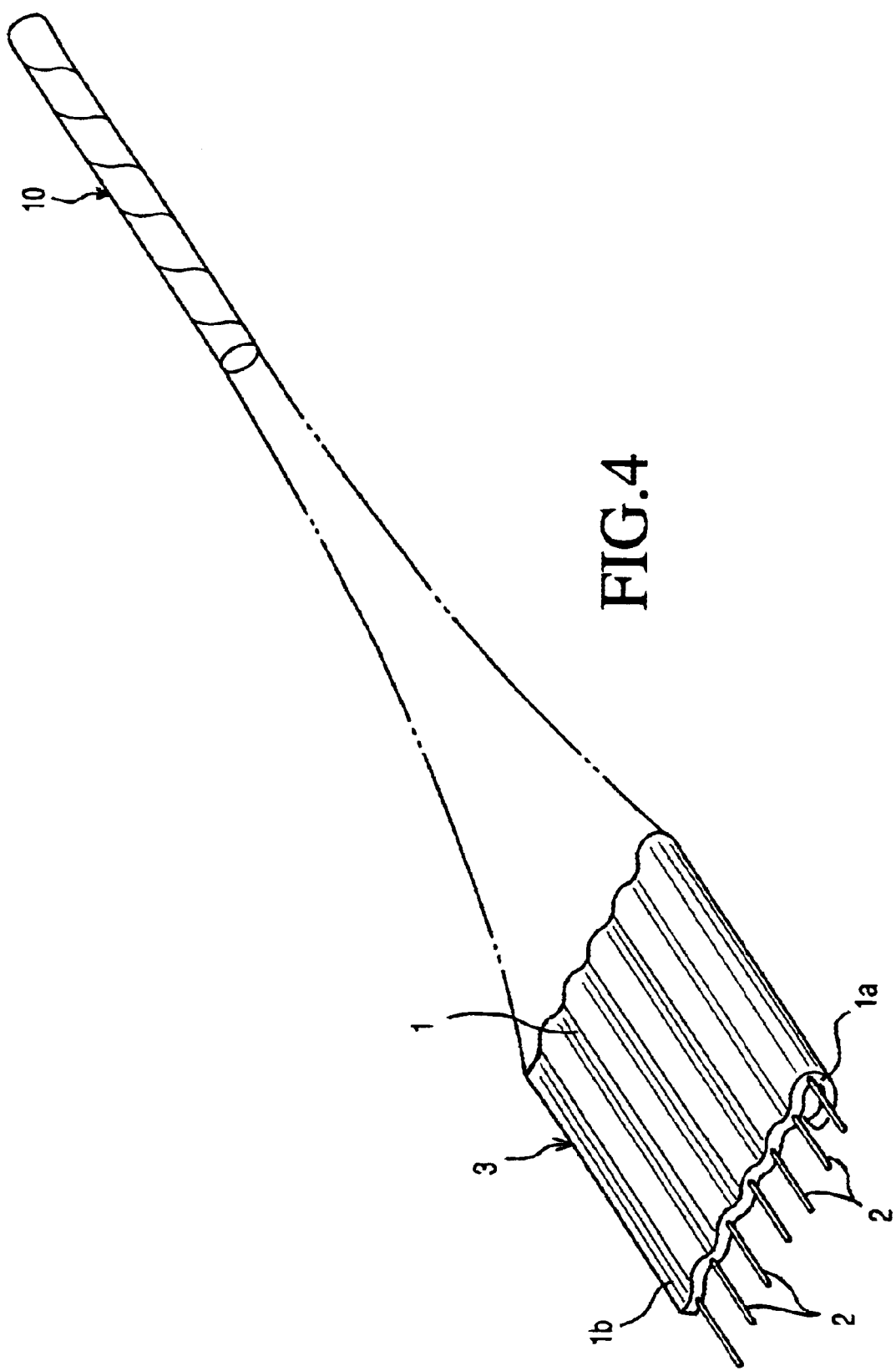
FIG. 4 is a perspective view showing a still further embodiment of the invention.

FIG. 4 is a perspective view showing a still further embodiment of the braiding yarn made of expanded graphite of the invention. In the figure, in the braiding yarn 10 made of expanded graphite, a braiding yarn base material 3 of the inner-reinforce type is used in which a plurality of reinforcing fibers 2, 2 are embedded in the longitudinal direction in an expanded graphite tape 1 of a predetermined width, with forming gaps in the width direction. Both the end portions 1a in the width direction of the expanded graphite tape 1 are curled so that only one end portion in the width direction of the braiding yarn base material 3, i.e., one end portion 1a in the width direction of the expanded graphite tape 1 is directed toward the inner side in the width direction of the braiding yarn base material 3, and a plurality of places between the end portions 1a, 1b are bent in the longitudinal direction. Thereafter, the braiding yarn base material is twisted. Alternatively, the end portions 1a are curled while twisting the braiding yarn base material 3 of the innerreinforce type, and a plurality of places between the end portions 1a, 1b are bent in the longitudinal direction. The end portions 1a, 1b in the width direction of the expanded graphite tape 1 are directed toward the inner side in the width direction of the braiding yarn base material 3.

Figure 5:
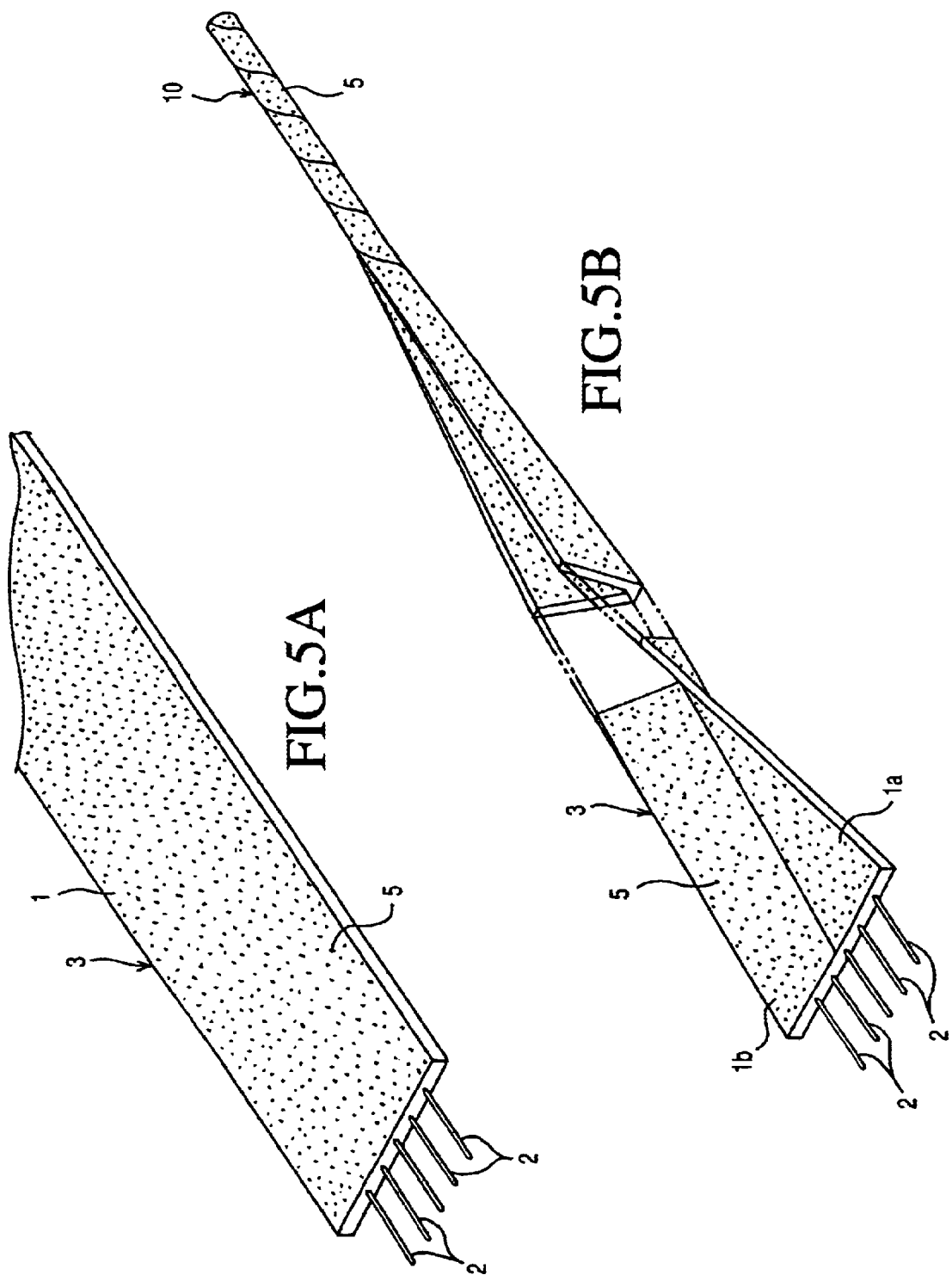
FIG. 5A is a perspective view of a braiding yarn base material in a still further embodiment of the invention.
FIG. 5B is a perspective view showing the still further embodiment of the invention.

FIGS. 5A and 5B are perspective views showing a still further embodiment of the braiding yarn made of expanded graphite of the invention. In these figures, in the braiding yarn 10 made of expanded graphite, a braiding yarn base material 3 of the inner-reinforce type is used in which, as shown in FIG. 5A, a plurality of reinforcing fibers 2, 2 are embedded in the longitudinal direction in an expanded graphite tape 1 of a predetermined width, with forming gaps in the width direction. Part of the expanded graphite particles 5 which are on the side of the surface of the braiding yarn base material 3, and which are highly oriented at a high density are removed by a blasting process. Thereafter, the braiding yarn base material is twisted with bending a center portion in the width direction of the braiding yarn base material 3, into a V-like shape in the longitudinal direction as shown in FIG. 5B, or the braiding yarn base material is twisted without performing bending into a V-like shape.

The expanded graphite particles which are on the side of the surface of the expanded graphite tape 1, and which are highly oriented at a high density are removed away by a n microblasting process using particles which are smaller in diameter than the expanded graphite particles. Specifically, a blasting process is performed using fine particles (for example, a particle diameter of 15 μm) of SiC or the like at an air pressure of 2 kg/cm² from a position which is separated by 150 mm from the outer face of the expanded graphite tape 1. When a microblasting process is performed in this way, the flaking resistance of the expanded graphite particles which has been in a range of 30 to 40 g before the blasting process is increased to a range of 140 to 150 g.

Figure 6:
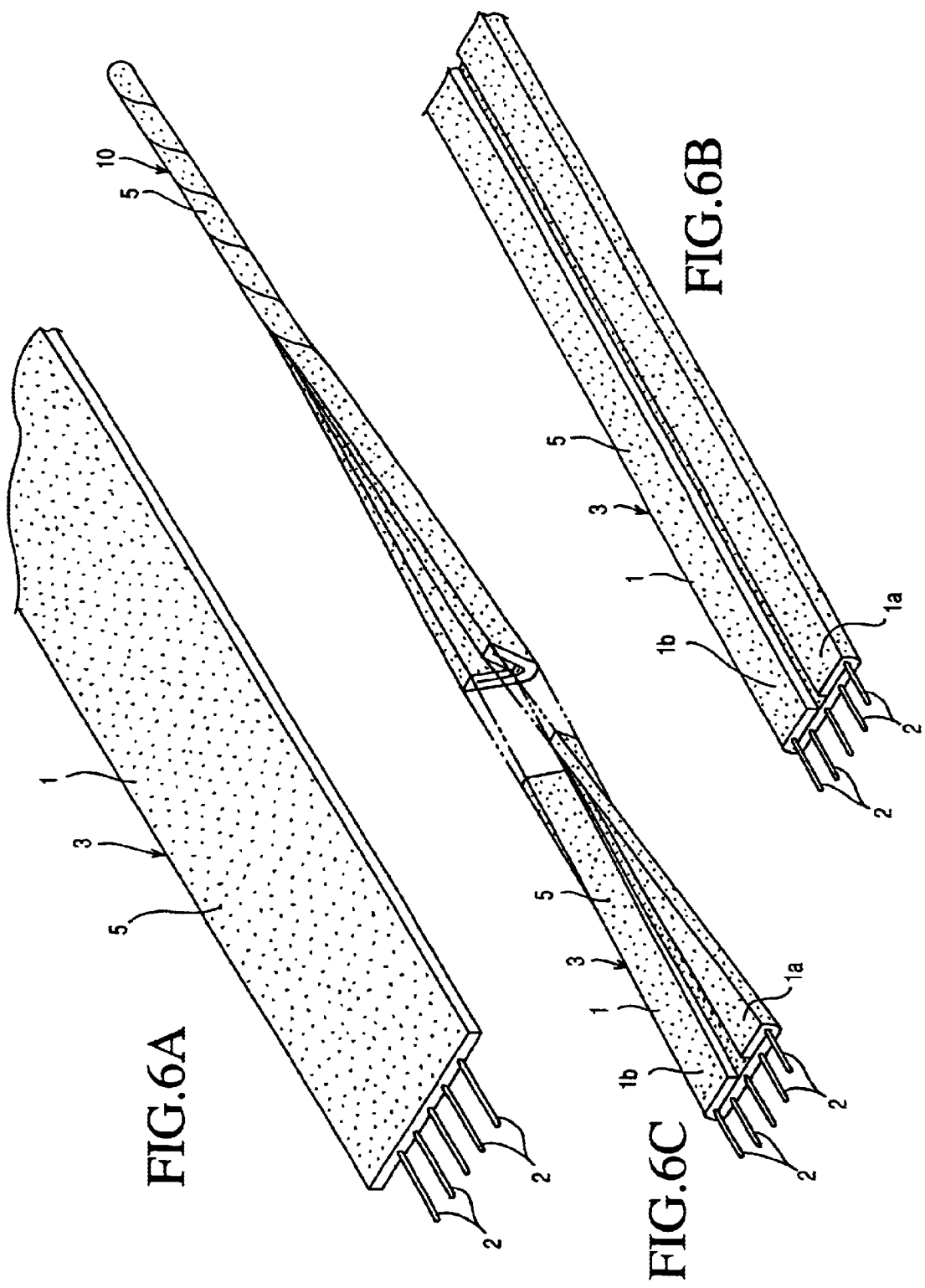
FIG. 6A is a perspective view of a braiding yarn base material in a still further embodiment of the invention.
FIG. 6B is a perspective view of a braiding yarn base material in the still further embodiment of the invention.
FIG. 6C is a perspective view showing the still further embodiment of the invention.

FIGS. 6A to 6C are perspective views showing a still further embodiment of the braiding yarn made of expanded graphite of the invention. In these figures, in the braiding yarn 10 made of expanded graphite, a braiding yarn base material 3 of the inner-reinforce type is used in which, as shown in FIG. 6A, a plurality of reinforcing fibers 2, 2 are embedded in the longitudinal direction in an expanded graphite tape 1 of a predetermined width, with forming gaps in the width direction. Part of expanded graphite particles 5 which are on the side of the surface of the braiding yarn base material 3, and which are highly oriented at a high density are removed by a blasting process. Both the end portions in the width direction of the braiding yarn base material 3, i.e., both the end portions 1a, 1b in the width direction of the expanded graphite tape 1 are bent so as to be directed toward the inner side in the width direction of the braiding yarn base material 3 as shown in FIG. 6B. Thereafter the braiding yarn base material is twisted with bending a center portion in the width direction of the braiding yarn base material 3, into a V-like shape in the longitudinal direction as shown in FIG. 6C, or the braiding yarn base material 3 of the innerreinforce type of FIG. 6B is twisted without performing bending into a V-like shape.

Figure 7:
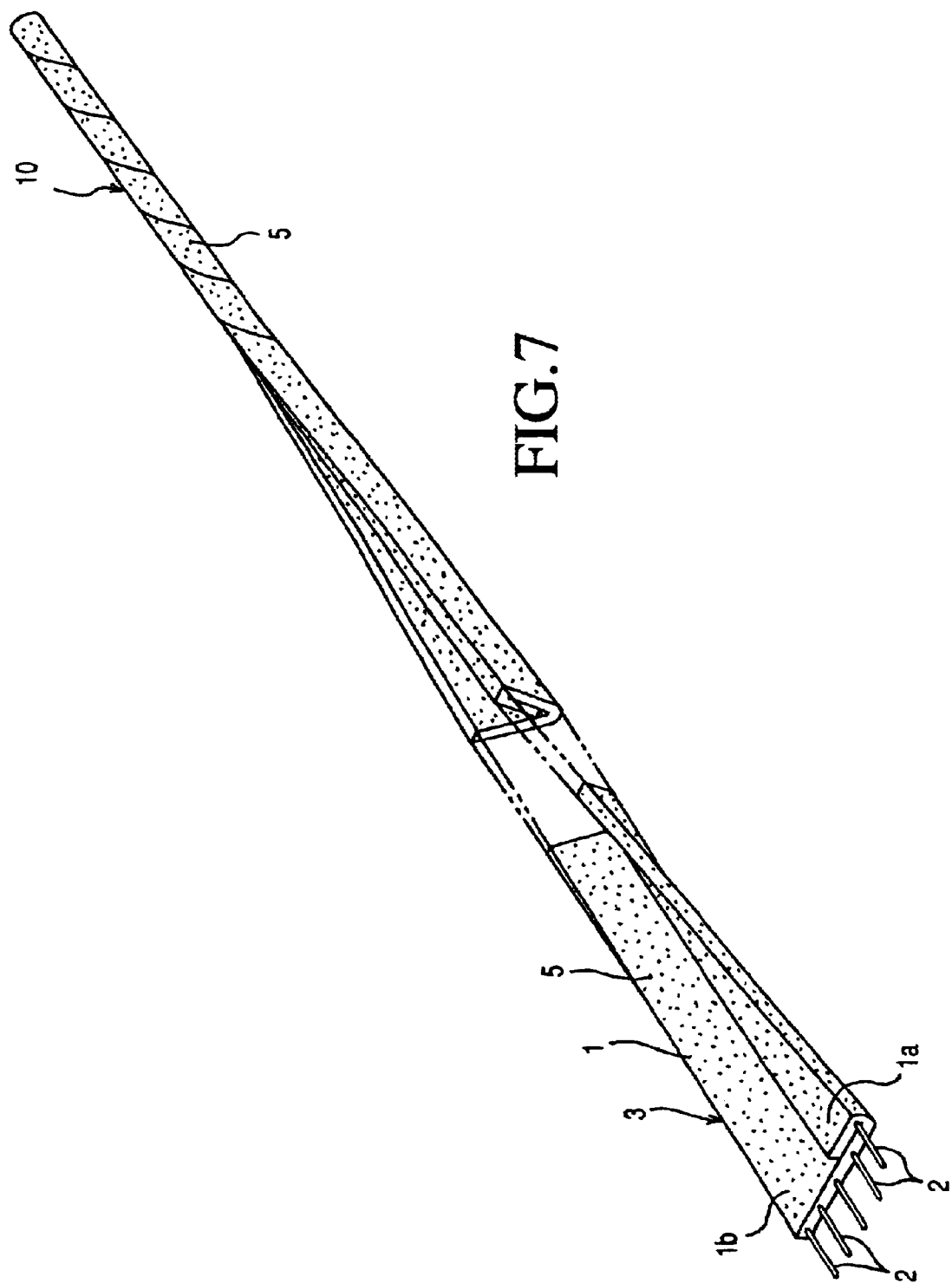
FIG. 7 is a perspective view showing a still further embodiment of the invention.

FIG. 7 is a perspective view showing a still further embodiment of the braiding yarn made of expanded graphite of the invention. In the figure in the braiding yarn 10 made of expanded graphite, a braiding yarn base material 3 of the inner-reinforce type is used in which a plurality of reinforcing fibers 2, 2 are embedded in the longitudinal direction in an expanded graphite tape 1 of a predetermined width, with forming gaps in the width direction. Part of expanded graphite particles 5 which are on the side of the surface of the braiding yarn base material 3, and which are highly oriented at a high density are removed by a microblasting process. Only one end portion in the width direction of the braiding yarn base material 3, i.e., one end portion 1a in the width direction of the expanded graphite tape 1 is bent so as to be directed toward the inner side in the width direction of the braiding yarn base material 3. Thereafter, the braiding yarn base material is twisted with bending a center portion in the width direction of the braiding yarn base material 3, into a V-like shape in the longitudinal direction, or the braiding yarn base material 3 is twisted without performing bending into a V-like shape.

Figure 8:
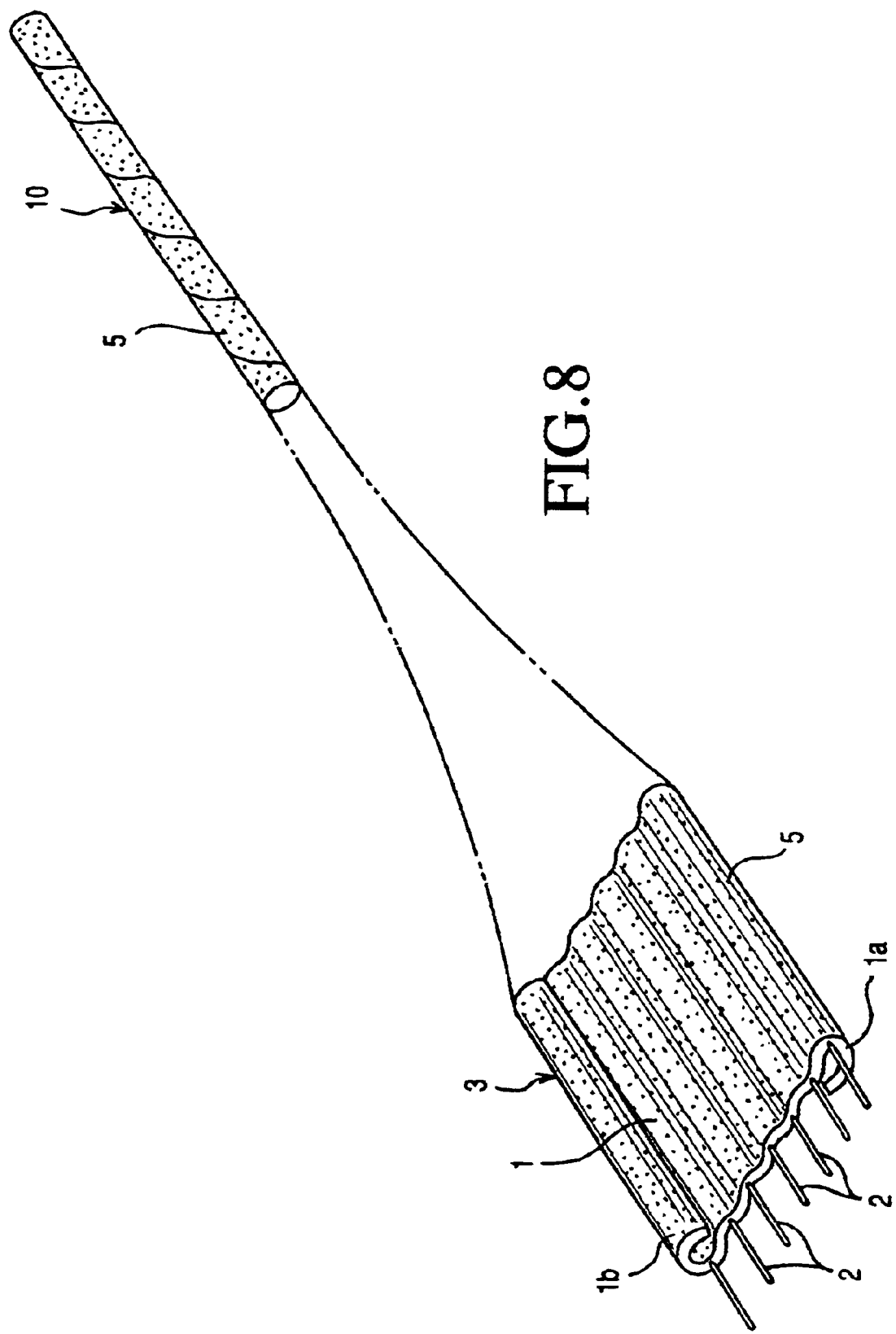
FIG. 8 is a perspective view showing a still further embodiment of the invention.

FIG. 8 is a perspective view showing a still further embodiment of the braiding yarn made of expanded graphite of the invention. In the figure, in the braiding yarn 10 made of expanded graphite, a braiding yarn base material 3 of the inner-reinforce type is used in which a plurality of reinforcing fibers 2, 2 are embedded in the longitudinal direction in an expanded graphite tape 1 of a predetermined width, with forming gaps in the width direction. Part of expanded graphite particles 5 which are on the side of the surface of the braiding yarn base material 3, and which are highly oriented at a high density are removed by a microblasting process. Both the end portions 1a, 1b in the width direction of the expanded graphite tape 1 are curled so that both the end portions in the width direction of the braiding yarn base material 3, i.e., both the end portions 1a, 1b in the width direction of the expanded graphite tape 1 are directed toward the inner side in the width direction of the braiding yarn base material 3, and a plurality of places between the end portions 1a, 1b are bent in the longitudinal direction. Thereafter, the braiding yarn base material is twisted. Alternatively, the end portions are curled while twisting the braiding yarn base material 3 of the inner-reinforce type which has undergone a microblasting process, and a plurality of places between the end portions 1a, 1b are bent in the longitudinal direction. The end portions 1a, 1b in the width direction of the expanded graphite tape 1 are directed toward the inner side in the width direction of the braiding yarn base material 3.

Figure 9:
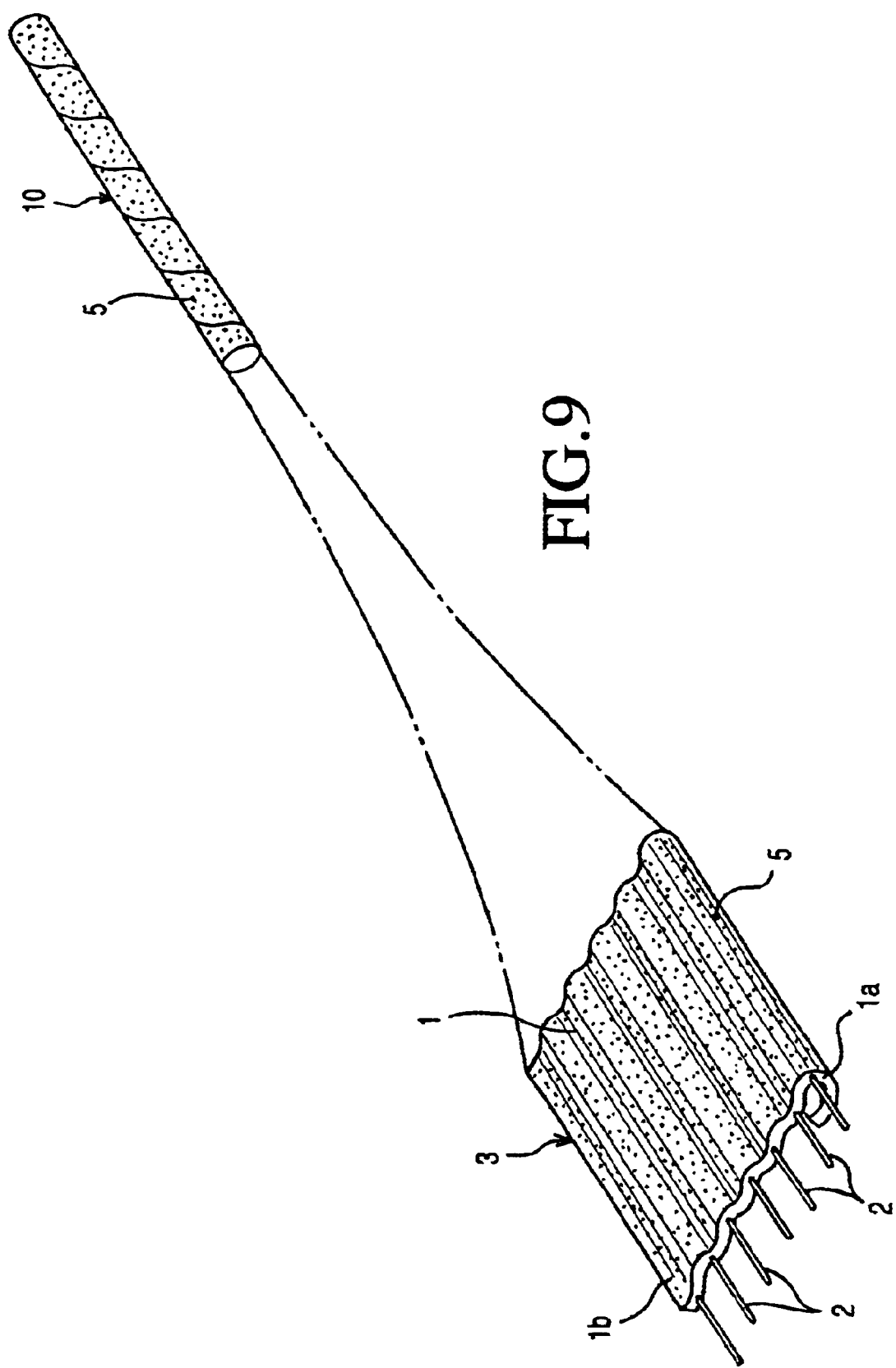
FIG. 9 is a perspective view showing a still further embodiment of the invention.

FIG. 9 is a perspective view showing a still further embodiment of the braiding yarn made of expanded graphite of the invention. In the figure, in the braiding yarn 10 made of expanded graphite, a braiding yarn base material 3 of the inner-reinforce type is used in which a plurality of reinforcing fibers 2, 2 are embedded in the longitudinal direction in an expanded graphite tape 1 of a predetermined width, with forming gaps in the width direction. Part of expanded graphite particles 5 which are on the side of the surface of the braiding yarn base material 3, and which are highly oriented at a high density are removed by a microblasting process. One end portion 1a in the width direction of the expanded graphite tape 1 is curled so that only one end portion in the width direction of the braiding yarn base material 3, i.e., the end portion 1a in the width direction of the expanded graphite tape 1 is directed toward the inner side in the width direction of the braiding yarn base material 3, and a plurality of places between the end portions 1a, 1b are bent in the longitudinal direction. Thereafter, the braiding yarn base material is twisted. Alternatively, the one end portion 1a is curled while twisting the braiding yarn base material 3 of the inner-reinforce type, and a plurality of places between the end portions 1a, 1b are bent in the longitudinal direction. The end portion 1a in the width direction of the expanded graphite tape 1 is directed toward the inner side in the width direction of the braiding yarn base material 3.

Figure 10:
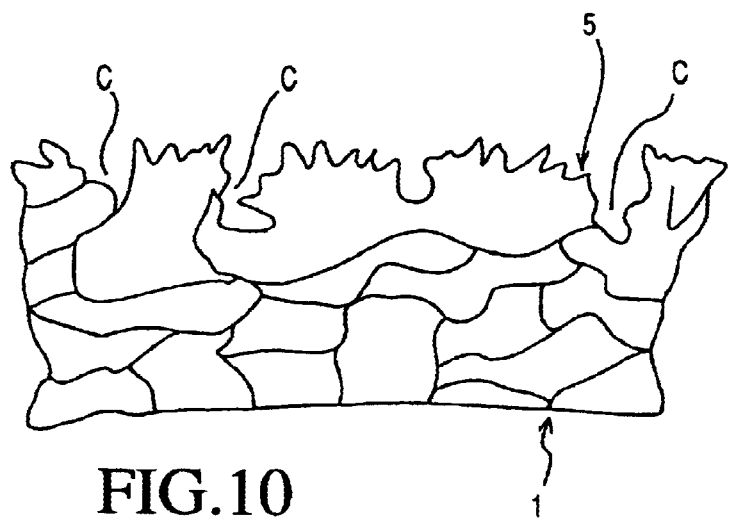
FIG. 10 is a partial enlarged section view showing a still further embodiment of the invention.

In each of the above-mentioned braiding yarn base materials 3, as shown in FIG. 10, when part of expanded graphite particles which are on the side of the surface of the expanded graphite tape 1, and which are highly oriented at a high density are removed away by a microblasting process using particles which are smaller in diameter than the expanded graphite particles, gaps c are formed among the expanded graphite particles. Therefore, a lubricating material easily permeates through the gaps c among the expanded graphite particles. When the gaps c are impregnated with: various kinds of rubber such as nitrile rubber (NBR), and chloroprene rubber (CR); a fluororesin such as PTFE described above; various kinds of synthetic resins such as epoxy, phenol, nylon, and polyetylene; or various kinds of oil such as silicone, it is possible to improve the adaptability, the lubricity, and the like of the braiding yarn base material 3.

Figure 11:
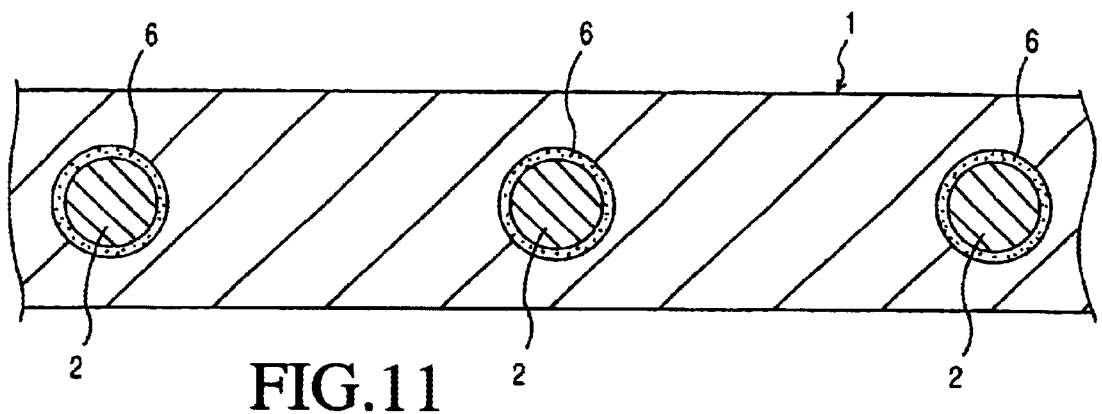
FIG. 11 is a partial enlarged section view showing a still further embodiment of the invention.

In each of the above-mentioned braiding yarn base materials 3, as shown in FIG. 11, when the whole periphery of each of the plurality of reinforcing fibers 2 which are embedded in the longitudinal direction in the expanded graphite tape 1 of the predetermined width, with forming gaps in the width direction may be bonded to the expanded graphite tape 1 via an adhesive agent 6. Alternatively, part of the outer periphery of each of the plurality of reinforcing fibers 2 may be bonded to the expanded graphite tape 1 via the adhesive agent 6. According to this configuration, breakage of the yearn can be prevented from occurring during the twisting process, by the braiding yarn base material 3 in which the high tensile strength of the reinforcing fibers 2 is surely given to the expanded graphite tape 1 of low tensile strength.

Figure 12:
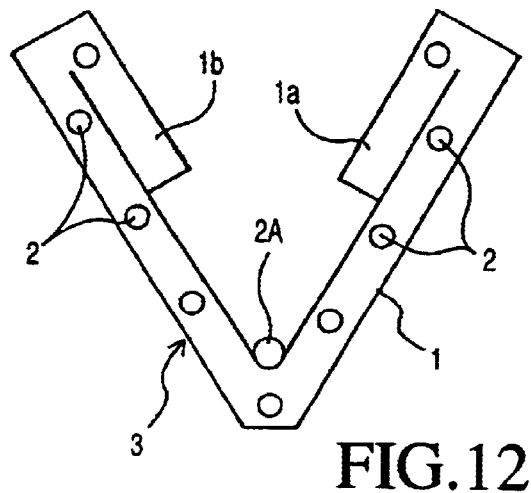
FIG. 12 is a section view showing a modification of a braiding yarn base material.

In each of the above-mentioned braiding yarn base materials 3, as shown in FIG. 12, for example, a reinforcing wire 2A such as a metal wire may be placed in a center portion in the width direction of the surface of the braiding yarn base material 3, or the reinforcing wire 2A may be placed in each of the bent valleys between the end portions shown in FIG. 3, FIG. 4, FIG. 8, and FIG. 9. According to this configuration, the tensile strength of the braiding yarn base material 3 can be further improved, so that breakage of the yearn can be prevented from occurring during the twisting process.

INDUSTRIAL APPLICABILITY

As described above, according to the braiding yarn made of expanded graphite of the invention, even when the braiding yarn base material is twisted, flaking of expanded graphite particles is reduced or prevented from occurring.

According to the invention, when the surface side of the expanded graphite tape is previously removed by a blasting process, impregnation with a lubricating agent is facilitated, and the adaptability, the lubricity, and the like of the braiding yarn base material can be improved.

According to the invention, when the surface side of the expanded graphite tape is previously removed away by a blasting process, impregnation with a lubricating agent is facilitated, and the adaptability, the lubricity, and the like of the braiding yarn base material can be improved.

According to the invention, when reinforcing fibers are embedded in the expanded graphite tape via an adhesive agent, high tensile strength of the reinforcing fibers is surely given to the expanded graphite tape of low tensile strength, so that breakage of the yearn can be prevented from occurring during a twisting process.

What is claimed is:

1. A braiding yarn made of expanded graphite which is to be used in a gland packing, wherein said braiding yarn is formed so that at least one end portion in a width direction of a braiding yarn base material in which reinforcing fibers are embedded in an expanded graphite tape is bent toward an inner side in the width direction of said braiding yarn base material.

2. A braiding yarn made of expanded graphite which is to be used in a gland packing, wherein said braiding yarn is formed so that at least one end portion in a width direction of a braiding yarn base material in which reinforcing fibers are embedded in an expanded graphite tape is bent toward an inner side in the width direction of said braiding yarn base material and a portion between both end portions in the width direction is bent, and said braiding yarn base material is consequently twisted.

3. A braiding yarn made of expanded graphite according to claim 2, wherein said reinforcing fibers are embedded in said expanded graphite tape via an adhesive agent.

4. A braiding yarn made of expanded graphite which is to be used in a gland packing, wherein said braiding yarn is formed so that at least one end portion in a width direction of a braiding yarn base material in which reinforcing fibers are embedded in an expanded graphite tape and part of expanded graphite particles on a side of a surface of said expanded graphite tape are removed away by a blasting process is bent toward an inner side in the width direction of said braiding yarn base material, and said braiding yarn base material is consequently twisted.

5. A braiding yarn made of expanded graphite which is to be used in a gland packing, wherein said braiding yarn is formed so that at least one end portion in a width direction of a braiding yarn base material in which reinforcing fibers are embedded in an expanded graphite tape and part of expanded graphite particles on a side of a surface of said expanded graphite tape are removed away by a blasting process is bent toward an inner side in the width direction of said braiding yarn base material and a portion between both end portions in the width direction is bent, and said braiding yarn base material is consequently twisted.

6. A braiding yarn made of expanded graphite according to claim 5, wherein the surface side of said expanded graphite tape on which the removal by the blasting process on said braiding yarn base material is performed is impregnated with a lubricating material.

7. A braiding yarn made of expanded graphite according to claim 5, wherein said reinforcing fibers are embedded in said expanded graphite tape via an adhesive agent.

8. A braiding yarn made of expanded graphite which is to be used in a gland packing, wherein a braiding yarn base material in which reinforcing fibers are embedded in an expanded graphite tape and part of expanded graphite particles on a side of a surface of said expanded graphite tape removed by a blasting process is twisted, and wherein the surface side of said expanded graphite tape on which the removal by the blasting process on said braiding yarn base material is performed is impregnated with a lubricating material.

9. A braiding yarn made of expanded graphite which is to be used in a gland packing, wherein said braiding yarn is twisted so that at least one end portion in a width direction of a braiding yarn base material in which reinforcing fibers are embedded in an expanded graphite tape and part of expanded graphite particles on a side of a surface of said expanded graphite tape removed by a blasting process is directed toward an inner side in the width direction of said braiding yarn base material, and wherein the surface side of said expanded graphite tape on which the removal by the blasting process on said braiding yarn base material is performed is impregnated with a lubricating material.

10. A braiding yarn made of expanded graphite which is to be used in a gland packing, wherein said braiding yarn is twisted so that at least one end portion in a width direction of a braiding yarn base material in which reinforcing fibers are embedded in an expanded graphite tape is directed toward an inner side in the width direction of said braiding yarn base material, and wherein said reinforcing fibers are embedded in said expanded graphite tape via an adhesive agent.

11. A braiding yarn made of expanded graphite which is to be used in a gland packing, wherein a braiding yarn base material in which reinforcing fibers are embedded in an expanded graphite tape and part of expanded graphite particles on a side of a surface of said expanded graphite tape removed by a blasting process is twisted, and wherein said reinforcing fibers are embedded in said expanded graphite tape via an adhesive agent.

12. A braiding yarn made of expanded graphite which is to be used in a gland packing, wherein said braiding yarn is twisted so that at least one end portion in a width direction of a braiding yarn base material in which reinforcing fibers are embedded in an expanded graphite tape and part of expanded graphite particles on a side of a surface of said expanded graphite tape are removed away by a blasting process is directed toward an inner side in the width direction of said braiding yarn base material, and wherein said reinforcing fibers are embedded in said expanded graphite tape via an adhesive agent.

13. A braiding yarn made of expanded graphite which is to be used in a gland packing, wherein a braiding yarn base material in which reinforcing fibers are embedded in an expanded graphite tape and part of expanded graphite particles on a side of a surface of said expanded graphite tape removed by a blasting process is twisted, wherein the surface side of said expanded graphite tape on which the removal by the blasting process on said braiding yarn base material is performed is impregnated with a lubricating material, and wherein said reinforcing fibers are embedded in said expanded graphite tape via an adhesive agent.

* * * * *